May 8, 1934.   A. SCHMID ET AL   1,958,070

POWER TRANSMISSION CLUTCH

Filed Nov. 9, 1931   2 Sheets-Sheet 1

May 8, 1934.  A. SCHMID ET AL  1,958,070
POWER TRANSMISSION CLUTCH
Filed Nov. 9, 1931  2 Sheets-Sheet 2

Patented May 8, 1934

1,958,070

UNITED STATES PATENT OFFICE 1,958,070

POWER TRANSMISSION CLUTCH

Anton Schmid, Stuttgart, Hermann Klein, Feuerbach, and Alfred Mattes and Albert Callsen, Stuttgart, Germany, assignors to Robert Bosch Aktiengesellschaft, Stuttgart, Germany Application November 9, 1931, Serial No. 573,990
In Germany November 21, 1930

5 Claims. (Cl. 74—7).

The invention relates to multiple disc clutches such as are more particularly suitable for electrical starters for internal combustion engines and of the type in which the friction clutch becomes disengaged when the driven member overruns the driving member. The known friction clutches of this kind have the disadvantage, that as the pressure rises due to the rapidly increasing friction of the clutch they soon commence to function as a rigid clutch and therefore do not protect the clutch parts from injury should conditions of overload or other unforseen occurrence in operation arise.

According to this invention this drawback is avoided in that the clutch discs are able to still move forward by a predetermined distance in relation to the usual starter pinion even when the normal starting torque is exceeded.

The invention is more particularly with reference to the accompanying drawings, in which:—

Figure 1:
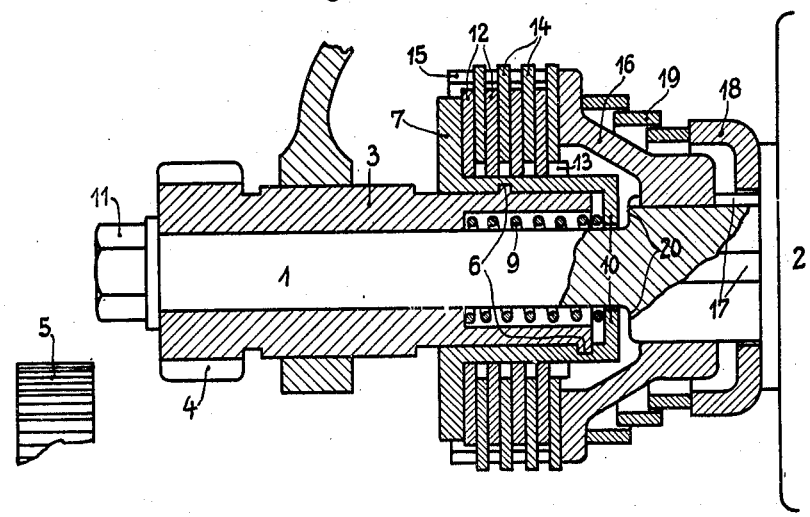
Figure 1 shows a multiple disc clutch, partly in section.
Figure 2:
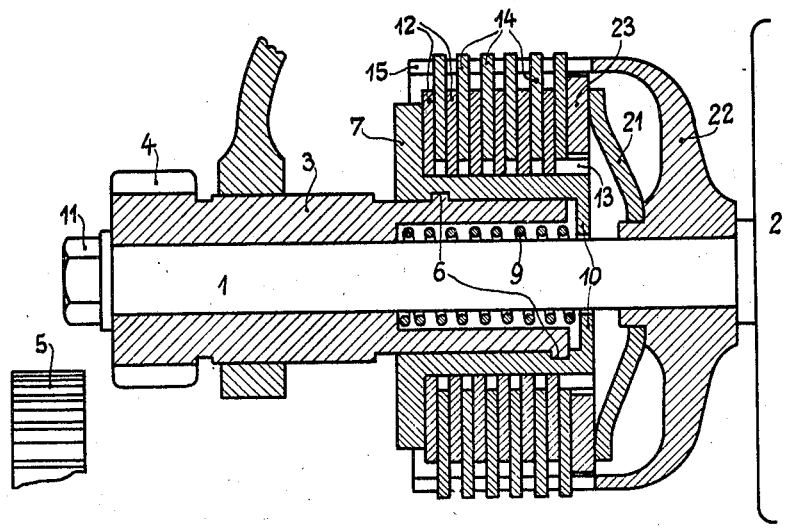
Figure 2 is a second form of construction, also in section.
Figure 3:
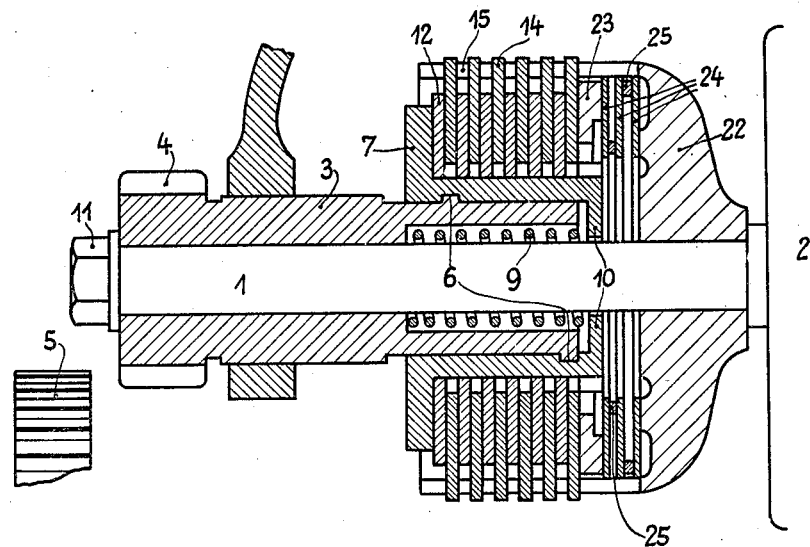

Figure 3 a third form of construction, also in section.

On the shaft 1 of the armature of an electrical starting apparatus 2, a hollow shaft 3 is rotatably mounted. One end of the shaft 3 is formed as a pinion 4, which in starting meshes with the toothed wheel 5 of the engine flywheel upon the axial displacement of the armature of the starter motor. The other end has an external thread 6 of high pitch, the direction of the thread being such that torque transmitted from the motor shaft 1 to the pinion 4 causes a sleeve 7, mounted on the threaded part 6 of shaft 3, to move axially away from the pinion. At the end of the thread 6 the shaft 3 is bored to receive a spring 9, which bears against a flange 10 of the sleeve 7. A stop-nut 11 limits the axial movement of the pinion shaft 3 on the shaft 1 towards the flywheel. On the sleeve 7, discs 12 of the one element of a multiple disc clutch are mounted, which are driven by splines 13 on the sleeve 7. The discs 14 of the other element of the clutch engage in slots 15 on the periphery of a drum-like flange 16. This flange is so arranged on the shaft 1 that it can slide axially, but on the rotation of the armature 2 is driven by splines 17 on the shaft 1. Between this flange 16, against which the clutch discs are pressed, and an abutment 18, a spring buffer 19 is inserted. The abutment 18 is firmly connected with the armature of the starter 2. The shaft 1 has a shoulder 20 against which the sleeve 7 can abut.

This multiple disc clutch works in the following manner:—

In the position of rest of the shaft 1, the spring 9 presses the clutch discs 12 and 14 against each other in known manner with a slight pressure, so that the pinion before its engagement with the flywheel 5 is rotated by the clutch. As soon as the pinion is in mesh, the sleeve 7 rotated with the clutch discs is screwed up against the flange 16 and presses the discs 12, 14 firmly together so that these can transmit the torque necessary for starting the internal combustion engine. The spring tensioned between the displaceable flange 16 and the abutment 18 is of such strength that it is only slightly compressed under normal torque conditions. When however the pressure between the clutch discs substantially increases due to a strong and sudden overloading, for example, due to a back-fire of the motor, the spring 19 is further compressed. The distance by which the clutch plates recede on the compression of the spring 19 corresponds to a definite degree of rotation of the pinion 4. Should therefore the toothed rim 5 of the fly-wheel be subjected to any sudden shock the pinion 4 can thus yield and transmit the increase of work received from the blow to the clutch to be absorbed by the spring 19. If the pressure continues to increase, the sleeve 7 comes up against the shoulder 20 of the shaft 1. From now on no further pressure is exerted on the clutch discs themselves than that given by the tension of the spring, because the sleeve owing to the stop cannot move further. A still further rise of torque will not increase the pressure on the clutch but will cause the clutch to slip if increased beyond the driving limit of the clutch.

In the second example of construction, a spring disc 21 is inserted between a pressure plate 23 and the spider 22 connected fast with the shaft 1. In its method of working this construction does not differ essentially from that already described, it is cheaper to manufacture because the shaft of the armature is no longer splined.

In Figure 3 a construction is illustrated which instead of a single spring disc has several such discs 24, between which rigid rings 25 are inserted alternately at the inner and outer periphery.

We declare, that what we claim is

1. A power transmission clutch comprising a driving element, a driven element, clutch elements cooperating therewith, a spring normally holding said clutch elements in slight driving engagement, a threaded sleeve, a threaded shaft rotatably mounted on said driving element, the rotation of which shaft causes axial displacement of said sleeve to bring said clutch elements into strong driving engagement, a second spring permitting bodily displacement of the said clutch elements on excess displacement of the said sleeve, and a stop, carried by said driving member, adapted to be engaged by said sleeve when said second spring has been compressed a predetermined amount to prevent further displacement of the clutch elements.

2. A power transmission clutch comprising a driving element, a driven element, clutch elements cooperating therewith, a spring normally holding said clutch elements in slight driving engagement, a threaded sleeve supporting said clutch elements, a threaded shaft rotatably mounted on said driving element, the rotation of which shaft causes axial displacement of said sleeve to bring said clutch elements into strong driving engagement, a second spring permitting bodily displacement of the said clutch elements on excess displacement of the said sleeve, and a stop, carried by said driving member, adapted to be engaged by said sleeve when said second spring has been compressed a predetermined amount to limit the axial displacement of said sleeve and said clutch elements so that further increase of torque through the clutch causes it to slip.

3. A power transmission clutch comprising a driving shaft, a driven element loose on said shaft, a sleeve, a high pitch thread connection between said driven element and said sleeve, a spider on said shaft, sets of friction clutch discs on said spider and said sleeve respectively, spring means between said spider and said discs allowing bodily displacement of said clutch discs on excess of torque, and a stop, carried by said driving shaft, adapted to be engaged by said sleeve when said spring means has been compressed a predetermined amount to prevent further displacement of the clutch discs.

4. A power transmission clutch comprising a driving member, a driven member, said driving member having clutch elements positively engaged by said driving member, said driven member comprising a threaded sleeve and having clutch elements positively engaged thereby, a spring normally holding the elements of said members in slight driving engagement, a threaded shaft the rotation of which relative to said sleeve causes axial displacement of said sleeve to bring said clutch elements into stronger frictional engagement, resilient means in series with said elements to continuously exert pressure therebetween and a stop, carried by said driving member, adapted to be engaged by said sleeve when said resilient means has been compressed a predetermined amount to limit the pressure which said resilient means can exert on said clutch elements.

5. A power transmission clutch comprising a driving shaft, a driven element loose on said shaft, a sleeve, a thread connection between said driven element and said sleeve, a spider on said shaft, sets of clutch discs on said spider and said sleeve respectively, disc spring means between said spider and said discs to continuously exert pressure between said sets of discs, and a stop, carried by said driving shaft, adapted to be engaged by said sleeve when said disc spring means has been compressed a predetermined amount to limit the pressure which said disc spring means can exert on said clutch discs.

ANTON SCHMID.
HERMANN KLEIN.
ALFRED MATTES.
ALBERT CALLSEN.